Patented Oct. 3, 1950

2,524,174

UNITED STATES PATENT OFFICE 2,524,174

TREATMENT OF IMPURE CALCIUM NITRATE

Mathijs H. R. J. Plusje, Beek, and Willem van der Zalm, Geleen, Netherlands, assignors to De Directie van de Staatsmijnen in Limburg, acting for and on behalf of the State of the Netherlands, Heerlen, Netherlands No Drawing. Application April 1, 1947, Serial No. 738,740. In the Netherlands June 12, 1945

Section 1, Public Law 690, August 8, 1946
Patent expires June 12, 1965

4 Claims. (Cl. 71—58)

This invention relates to the treatment of impure calcium nitrate and, more particularly, it is concerned with the neutralization of acidic impurities contained in calcium nitrate obtained in the manufacture of phosphate fertilizers by acid decomposition of raw phosphate materials.

The economical and efficient transformation of naturally occurring raw phosphate materials into a form which may be assimilated by plant life is a major problem. One of the principal methods for accomplishing this transformation is to treat the raw phosphate material with substantial quantities of strong mineral acids, such as nitric or sulfuric acids. After this acidic treatment, it is necessary to separate the modified phosphate compounds therefrom and this may be done by crystallizing or precipitating the phosphates from the acid liquors. In those cases where the acid treatment involves the use of nitric acid, calcium nitrate is obtained as a byproduct and may be crystallized from the acid liquors resulting in the process. However, the separated calcium nitrate crystals invariably occlude or entrain portions of the mother liquor, i. e., phosphoric acid. As a result, in the latter stages of purification of the resulting calcium nitrate, wherein the nitrate is subjected to melting, concentrating or calcining treatments, nitrous fumes are expelled and nitrogen losses occurred because of the presence of the free phosphoric acid or acid phosphates occluded from the mother liquors.

Several methods have been suggested for overcoming the disadvantages of the presence of the phosphate materials in the calcium nitrate as described above. Thus, in Dutch Patent 27,170, it is proposed to neutralize the phosphate content with ammonia or ammonia carbonate, but such a procedure is undesirable because it gives rise to strong hygroscopic properties in the final product. Another method proposed in this same patent is to add calcium carbonate, calcium oxide or calcium hydroxide to the contaminated nitrate. Although, as pointed out in the indicated Dutch patent, it is possible to neutralize the phosphoric acid in the nitrate salt in this manner by direct addition of calcium oxide or calcium hydroxide, a large excess of the neutralizing agent is required.

A principal object of this invention is the provision of a new process for the purification of calcium nitrate solutions or molten masses which have an acid reaction and contain phosphates, i. e., are contaminated with phosphoric acid or acid phosphates, so as to neutralize the acidity thereof. A further object is the provision of a procedure whereby alkaline calcium compounds, such as calcium oxide or calcium hydroxide, may be used in relatively small amounts for such neutralizations. Still further objects and the entire scope of applicability of the present invention will become apparent from the description given herein.

These objects are accomplished according to the procedure of the present invention by incorporating the neutralizing calcium compound, e. g., calcium oxide, in a separate, relatively small quantity of calcium nitrate which contains substantially no phosphate ions prior to the addition of the neutralizing agent to the impure nitrate salt. Advantageously, the neutralizing calcium compound may be incorporated in a portion of calcium nitrate solution or fused salt obtained from a preceding neutralization step. Thereafter, the contaminated calcium nitrate containing phosphoric acid or acid phosphates is neutralized by admixture with the mixture of calcium compound dissolved in the substantially phosphate ion free calcium nitrate.

The success of the present invention is dependent upon two discoveries. First, it has been found that calcium oxide, and similar calcium compounds of an alkaline reaction, possess surprisingly good solubility in concentrated solutions of calcium nitrate or molten calcium nitrate. Thus, it has been found that a 70% solution of calcium nitrate at 100° C. can dissolve 16 grams of calcium oxide per liter or 30 times as much as an equivalent quantity of water at the same temperature.

Secondly, it has been found that if the calcium neutralizing compound is first dissolved in an appreciable quantity of uncontaminated calcium nitrate and that this is then mixed with the contaminated calcium nitrate to be neutralized, actual neutralization of the acidic phosphate portions of the contaminated nitrate will be accomplished. The success of this two step neutralization operation appears to be due to the fact that the solution of the calcium neutralizing agent in phosphate ion free calcium nitrate, prior to addition to the impure salt, prevents the formation of calcium phosphate pellicles or films about the neutralizing agent during the neutralization step. Thus, it appears that without the use of the procedure of this invention, lime particles which are used in an attempt to neutralize the contaminated nitrates are covered with thin layers of calcium phosphate so that the remaining agent on the inner side of this film is prevented from further neutralizing action.

The solution of the neutralizing agent in calcium nitrate may be accomplished in any satisfactory manner. Thus, the agent may be added in regulated quantities to a calcium nitrate solution in a stirring vessel. Another method of dissolving the agent is to allow calcium nitrate solution to flow through a column or tower which is filled with lumps of the neutralizing agent such as slaked lime.

It will be apparent to those skilled in the art that the particular quantities of the ingredients used in our process will be dependent upon the composition of the contaminated calcium nitrate being neutralized. Thus, the more contaminated the nitrate salt with the acid phosphate, the larger the quantity of neutralizing agent which is required. The proportions of neutralizing agent and pure calcium nitrate used to dissolve the agent may be varied considerably. Sufficient nitrate should be employed so as to completely dissolve the neutralizing agent at the temperatures involved. Excess of calcium nitrate over this minimum requirement may be employed, although, for maximum efficiency, the excess should be held to a minimum.

We claim:

1. A process for neutralizing impure calcium nitrate having an acid reaction and containing acid phosphorus containing ions which comprises forming a neutralizing agent for said impure calcium nitrate by dissolving a material from the group consisting of calcium oxide and calcium hydroxide in calcium nitrate containing no phosphate ions and then adding to a solution of said impure calcium nitrate substantially the amount of the resulting neutralizing agent necessary to just neutralize said impure calcium nitrate.

2. The process of claim 1, wherein the calcium nitrate used to dissolve the neutralizing agent comprises nitrate obtained from a previous neutralization.

3. The process of claim 1, wherein the impure calcium nitrate is in the form of an aqueous solution during the neutralization.

4. The process of claim 1, wherein the impure calcium nitrate is in the form of a molten mass during the neutralization.

MATHIJS H. R. J. PLUSJE.
WILLEM van der ZALM.

REFERENCES CITED

The following references are of record in the file of this patent:

UNITED STATES PATENTS

| Number | Name | Date |
| --- | --- | --- |
| 1,816,285 | Johnson | July 28, 1931 |
| 1,893,946 | Kaselitz | Jan. 10, 1933 |

FOREIGN PATENTS

| Number | Country | Date |
| --- | --- | --- |
| 308,726 | Great Britain | Mar. 25, 1929 |